United States Patent
Smith

(10) Patent No.: US 11,710,953 B2
(45) Date of Patent: *Jul. 25, 2023

(54) OUTDOOR ELECTRICAL OUTLET COVER

(71) Applicant: LVL-USA, New York, NY (US)

(72) Inventor: Jeffrey H. Smith, Southampton, NY (US)

(73) Assignee: LVL-US, LLC, New York, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/645,216

(22) Filed: Dec. 20, 2021

(65) Prior Publication Data
US 2022/0368120 A1 Nov. 17, 2022

Related U.S. Application Data

(63) Continuation-in-part of application No. 17/318,726, filed on May 12, 2021, now Pat. No. 11,387,596.

(51) Int. Cl.
| | | |
|---|---|---|
| *H02G 3/08* | (2006.01) | |
| *H01R 13/52* | (2006.01) | |
| *H01R 13/447* | (2006.01) | |
| *H01R 13/516* | (2006.01) | |

(52) U.S. Cl.
CPC ......... *H02G 3/088* (2013.01); *H01R 13/5213* (2013.01); *H01R 13/447* (2013.01); *H01R 13/516* (2013.01)

(58) Field of Classification Search
CPC .. H02G 3/088; H01R 13/5213; H01R 13/447; H01R 13/516
See application file for complete search history.

(56) References Cited

U.S. PATENT DOCUMENTS

| | | |
|---|---|---|
| 4,063,110 A | 12/1977 | Glick |
| 4,424,407 A | 1/1984 | Barbic |
| 5,059,748 A | 10/1991 | Allen et al. |
| 5,078,614 A | 1/1992 | Shotey |
| 7,766,695 B1 | 8/2010 | Czarnecki et al. |
| 9,368,900 B2 | 6/2016 | Lai |
| 11,264,768 B1 | 3/2022 | Monroe |

(Continued)

OTHER PUBLICATIONS

Notice of Allowance received for U.S. Appl. No. 17/318,726, dated May 6, 2022, 11 pages.

*Primary Examiner* — Tho D Ta
(74) *Attorney, Agent, or Firm* — Womble Bond Dickinson (US) LLP

(57) ABSTRACT

An outlet enclosure for enclosing an electrical outlet to cover the electrical outlet and its electrical socket. The outlet enclosure includes a base plate and an outlet cover or holder which wraps partially around the electrical outlet to allow access to the electrical socket. The outlet cover or holder includes tracks extending in a vertical direction along its outer surface. An outer cylindrical cover wraps completely around the outlet cover or holder. The outer cylindrical cover slides vertically via the tracks over the outlet cover or holder from a lowered position fully enclosing the outlet cover or holder to a raised position exposing the electrical socket to allow access to the electrical outlet so that a plug can be inserted into the socket of the electrical outlet. When the outer cylindrical cover is lowered, it protects the electrical outlet from exposure to the elements.

11 Claims, 12 Drawing Sheets

(56) References Cited

U.S. PATENT DOCUMENTS

| | | |
|---|---|---|
| 11,387,596 B1 * | 7/2022 | Smith ................ H01R 13/5213 |
| 2006/0141855 A1 | 6/2006 | Bloom et al. |
| 2011/0070756 A1 | 3/2011 | Peckham |
| 2021/0066848 A1 | 3/2021 | Klinedinst et al. |

* cited by examiner

OUTDOOR ELECTRICAL OUTLET COVER

FIELD OF THE INVENTION

The present invention relates to a cover for concealing an electrical outlet which is installed exterior to a building, house or other structure or area that is accessible by electricity. The electrical outlet is known as a WR-GFCI with a waterproof vertical cover and a may include a waterproof self-closing door of the type available from Hubbell Industries.

The electrical outlet or switch can be an electrical socket such as a 120 volt socket which accepts a three prong electrical plug, or any other socket configuration as determined by local regulations and laws.

BACKGROUND OF THE INVENTION

When electrical outlets are installed at outdoor locations, whether a building site or finished building or a home, such outlets must have certain features and characteristics which are needed to comply with what is known as the UL-231 standard and UL 514 A and UL 514 D. An exterior outlet to be certified by UL must first meet the NEMA 4X/IP65 ("NEMA") certifications as an electrical enclosure. The NEMA certification that this outlet will be certified for, will be a designation of 4X. Normal exterior outlets do not need to meet the high standards of a NEMA exterior enclosure with a 4X certification. This is one of the most difficult to obtain since the exterior enclosure must withstand moisture, dirt, dust, rain, sleet, snow, ice and hose directed water.

Such outlets typically are installed within a cover which is in the nature of a flap or door on the external surface of the outlet which can be opened so that an electric plug can be inserted into a socket of the outlet and closed when the electric plug is removed. For this type of outlet cover the actual cover must comply with code article 406.9B of the NEC code. The code requires that the receptacles must use a "while in use cover" that is identified as "Extra duty" Although such covers hide the electrical outlet/socket, when installed on an electrical conduit six inches off the ground, the result is usually not pleasing to the eye.

BRIEF SUMMARY OF THE INVENTION

The invention is directed to an outlet enclosure for a stand-alone electrical outlet intended for an outdoor installation. That is, the outlet and outlet enclosure extend from a ground location rather than being physically attached to the front or rear of a house or other structure. The outlet enclosure has an architecturally pleasing appearance but remains compliant with applicable standards such as UL-231 UL 514 A&D and NEC code 406.9B and NEMA enclosure standard 4X. In this manner, an installer is able to comply with all applicable standards without having to install the outlet on the exterior of the building or in an exterior waterproof electrical box mounted on conduit, with the installed outlet having an aesthetically pleasing appearance.

This invention is designed to be installed in exterior locations that may receive excessive moisture in the summer from irrigation systems and in the winter from normal weather. The invention is also designed to be installed in a garden location which can be discreetly hidden but readily accessible.

The invention is also designed to be installed away from an existing structure in high traffic areas either from foot traffic or equipment. In one embodiment, it is cast in high quality aluminum so that it can withstand a major impact without being dislodged, disconnected or damaged, and, unlike the prior art, it can withstand harsh weather conditions.

DETAILED DESCRIPTION OF THE INVENTION

Figure 1:
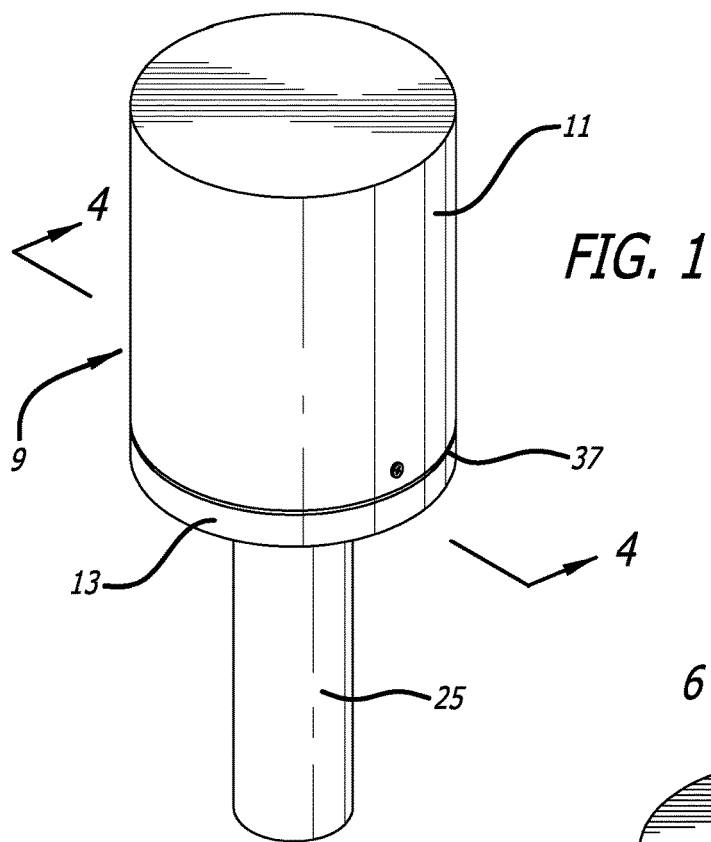
FIG. 1 is a top, side perspective view of the exterior of the invented outdoor electrical outlet enclosure.
Figure 2:
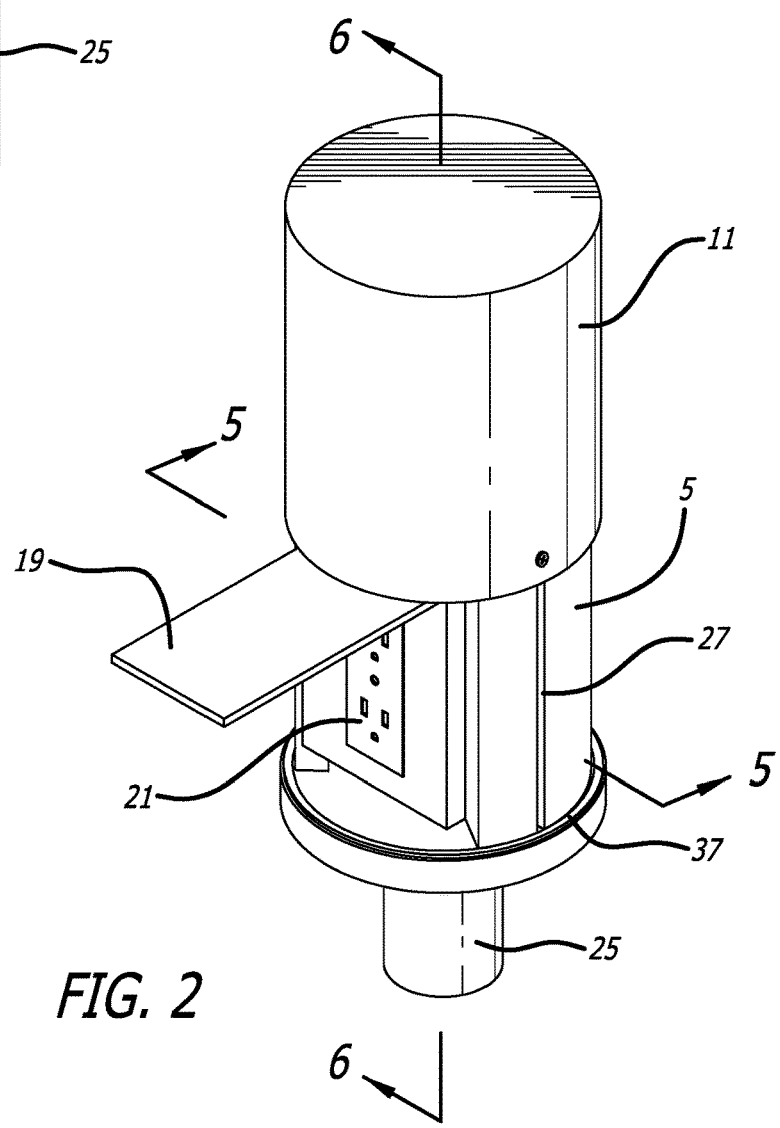
FIG. 2 is a top, side perspective view showing the invented outdoor electrical outlet enclosure with its outer cylindrical cover in a raised position exposing a portion of the outlet cover, a base plate, a portion of the outlet and a door for the outlet in an open position.
Figure 3:
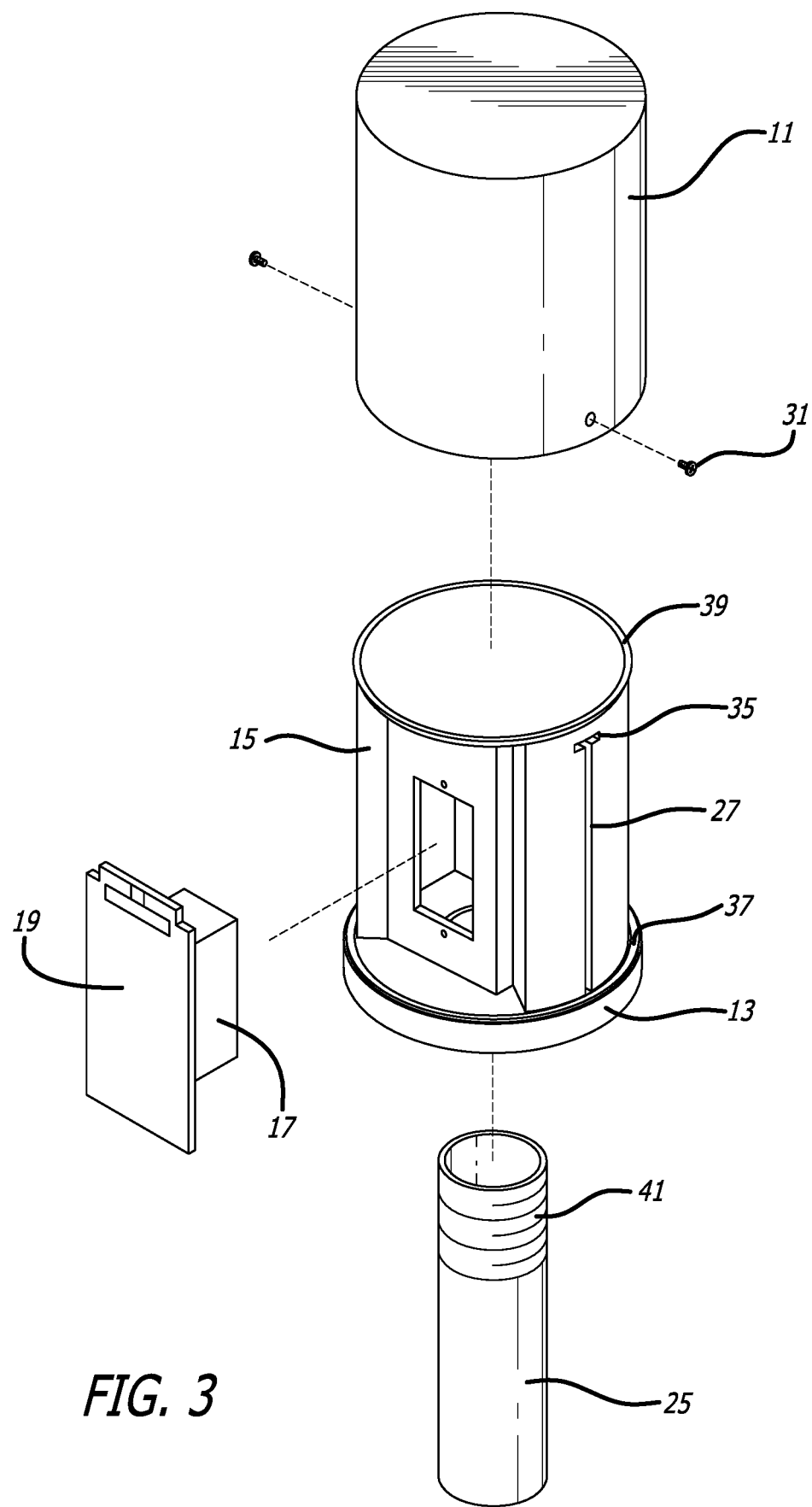
FIG. 3 is a top, side perspective exploded view showing the outer cylindrical cover, the outlet cover, the base plate, a GFCI outlet screwed to the door in a closed position and a threaded post for connecting to the base plate from which the power supply enters.

As shown in FIGS. 1, 2 and 3 an electrical outlet enclosure 9 includes an outlet cylindrical cover 11, a baseplate 13 on which is mounted a ¾-cylinder outlet cover (in FIG. 3) which wraps partially around a WR GFCI electrical outlet 17 designed to meet UL and NEMA standards for a wet location which may include a self-closing UL approved door cover 19 to protect the socket or sockets 21 of the electrical outlet 17. The ¾ cylinder outlet cover 15 leaves the outlet cover door, if present, and the outlet socket or sockets accessible since it only surrounds ¾ of the electrical outlet 17. The base plate is connected to a post 25 through which electrical wires 45 (see FIG. 6) extend to connect to the GFCI electrical outlet.

Such outlet door 19 can be a waterproof vertical cover made by Hubbell Industries which is spring loaded to close over the socket or sockets of the outlet. In an embodiment, the base plate 13 and ¾ cylinder outlet cover 15 are formed by a casting technique to form an integrated part, though the two pieces can be formed separately and then connected via welding or other connection mechanism. The outer cylindrical cover, base plate and outlet cover are typically made of the same material which can be any material suitable for an outdoor location that will not rust or corrode such as brass with a minimum thickness of 24 mm (³⁄₃₂"). In an embodiment, some parts, such as the outer cylindrical cover can be plastic.

As shown in FIG. 2, the outer cylindrical cover 11 slides up and down on one or more vertical tracks 27, that are cut into or otherwise formed on the outer surface of the outlet cover 15, from a raised position to a lowered position. In the raised position, the outlet cover door 19, if included, is exposed so that it can be raised to expose the one or more sockets 21. In the lowered position, the outer cylindrical cover 11 rests on the surface of the base plate 13. In an embodiment, there are two vertical tracks 27 formed on the outer surface of the outlet cover offset by 180 degrees from each other. The two tracks ensure smooth operation of the outer cylindrical cover as it is raised and lowered.

With reference to FIG. 3, one or more set screws 31 or the like extend from a side of the outer cylindrical cover into the one or more vertical tracks. At the top of the track or tracks, in an embodiment, a reverse L channel 35 is used to hold the outer cylindrical cover in place when it is in its raised position by a slight rotation when the topmost position is reached.

Figure 4:
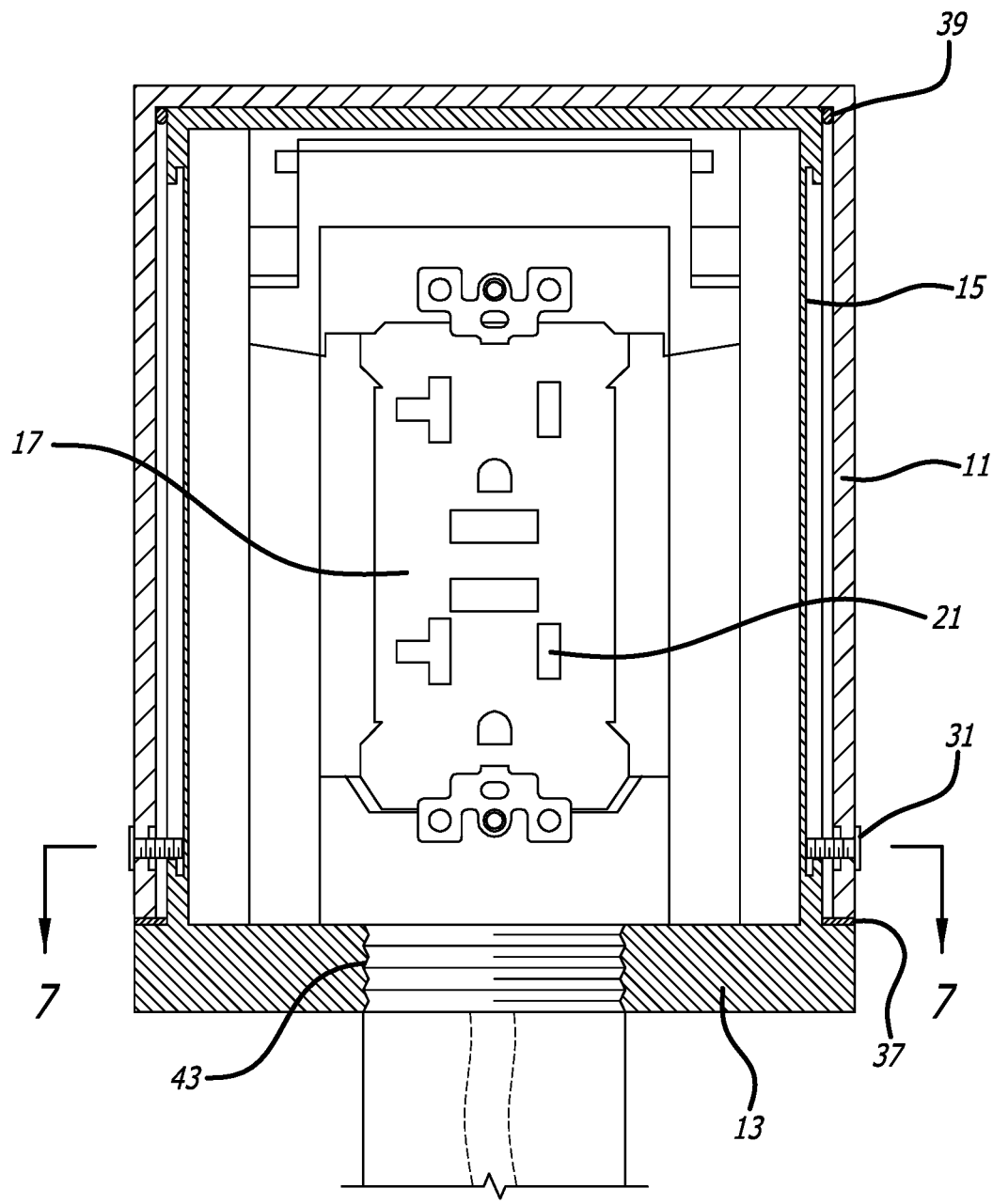
FIG. 4 is a side elevation view of the enclosure taken along line 4-4 of FIG. 1, showing the outer cylindrical cover, the outlet cover, the base plate and post and the outlet with two sockets.
Figure 5:
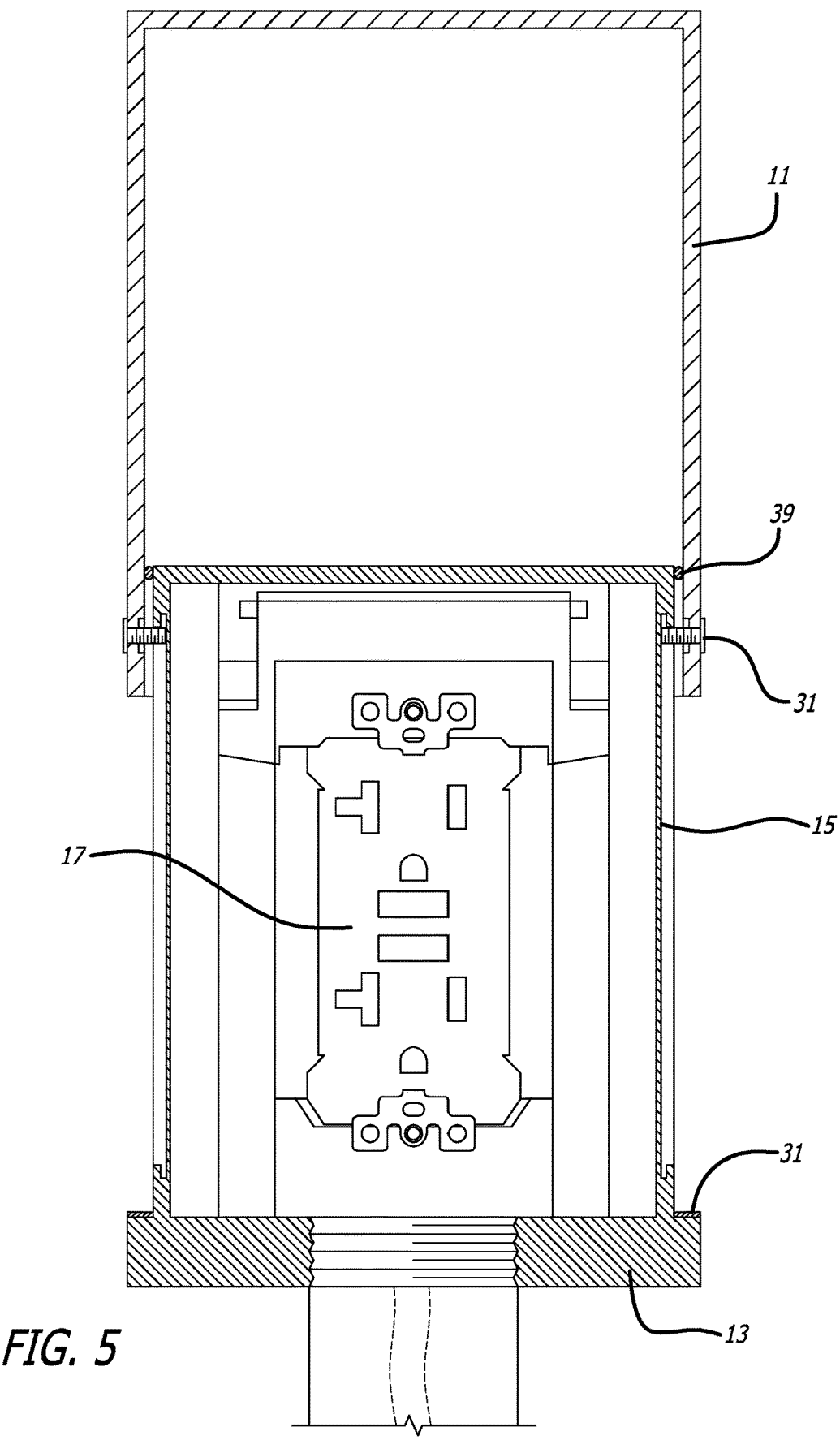
FIG. 5 is a side elevation view taken along line 5-5 of FIG. 2 showing the outer cylindrical cover in its raised position.

As best seen in FIG. 4, inside the outer cylindrical cover 11 on its bottom surface, in one embodiment, a rubber gasket 37 may be secured on the base plate to prevent any moisture from entering the unit when the outer cylindrical cover is lowered over the outer cover.

Additionally, a second rubber gasket 39 may be placed between outer cylindrical cover 11 and outlet cover 15. The second rubber gasket also make the raising and lowering of the cover a smooth transition by provided a buffer between the top of the outer cylindrical cover and the top of the outlet cover 15. This second rubber gasket also provides friction between the outer cylindrical cover and the outlet cover which, in an embodiment, holds in the outer cylindrical cover in place when raised to its upper position without rotating the outlet cover as explained below. Of course, gaskets 37 and 39 need not be made of rubber, but can be any suitable somewhat resilient material with sealing and friction properties similar to rubber.

To operate the unit, the outer cylindrical cover is manually raised. When completely extended in the raised position, although gasket 39 will hold the outer cylindrical cover in place, in an embodiment, the outer cylindrical cover may be turned to the left or right and held it in place since the L channel 35 is perpendicular to a corresponding vertical track 27 and engage set screws 31. Once outer cylindrical cover 11 is in the raised position, the outlet cover door 19, if present, can be opened and a plug (not shown) inserted into a socket 21 of the electrical outlet 17.

If used, the outlet cover door 19 is spring loaded to stay open while the plug is in the outlet, thereby protecting the plug and the outlet from moisture. When the outer cylinder cover is raised. The spring-loaded door, if used, will close over the plug to providing further protection from the weather. To disengage the plug, the outlet cover door, if present, is raised slightly and the plug removed from the socket, to let the outlet cover door, close over the socket or sockets. Then the outer cylindrical cover 11, if previously rotated, is rotated to the right or left, as needed, and the outer cylindrical cover is lowered so that it comes to rest on the base plate, either directly or via contact with gasket 39. In the lowered position, the outer cylindrical cover will protect the outlet from any irrigation system or other excessive weather conditions. In this manner, by locking the raised outer cylindrical cover, it is possible to operate the outlet enclosure using only one hand so that the plug can be easily inserted into socket 21 and subsequently removed.

Figure 6:
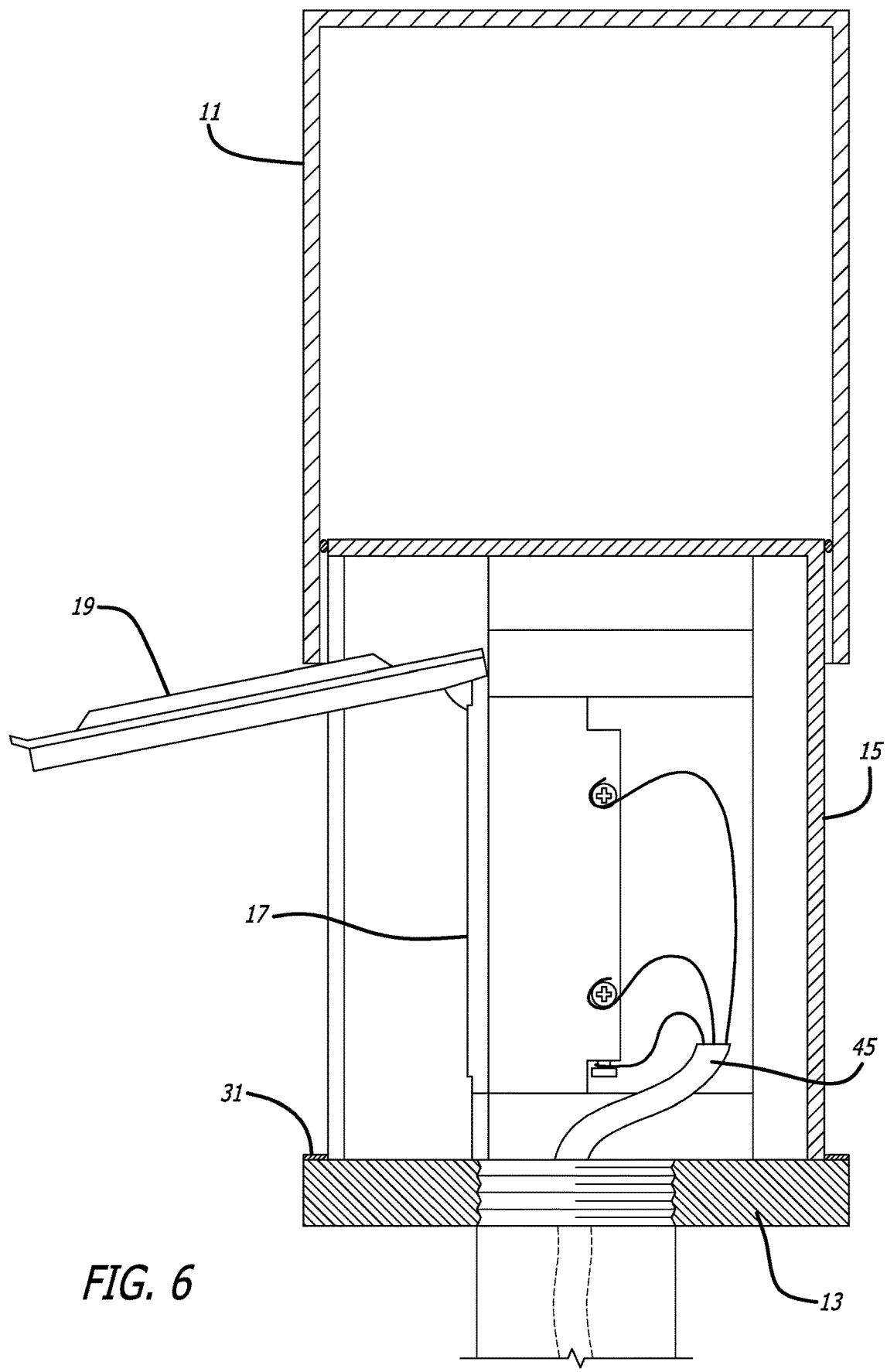
FIG. 6 is a is a side elevation view taken along line 6-6 of FIG. 2.
Figure 7:
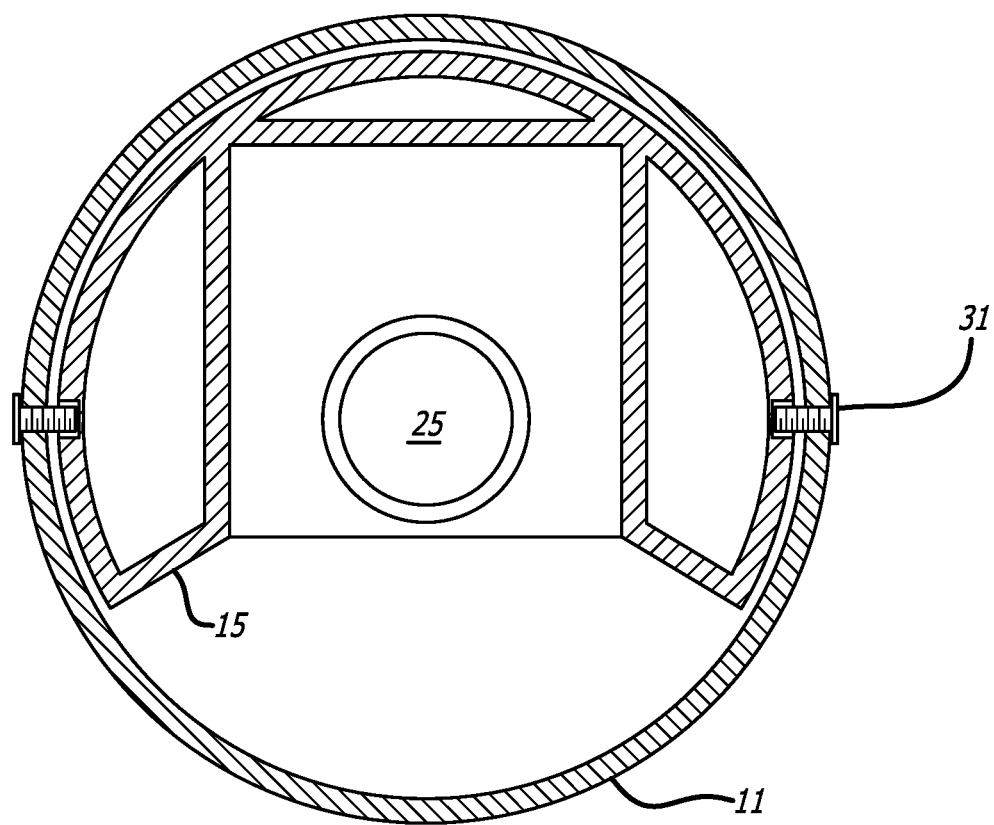
FIG. 7 is a top, plan view of the outer cylindrical cover, outlet cover door, base plate and support post taken along line 7-7 of FIG. 4.

To install the exterior ground outlet enclosure, the post 25 is typically a 1½"×18" pipe inserted into the ground per code requirements for the electrical wires 45 (see FIG. 6). The wires pass up through the pipe that is screwed via threads 41 on post 25 into matching threads 43 of base plate 13 as shown in FIGS. 3 and 4 and up through the outlet cover 15, to be connected to the GFCI outlet 17. The GFCI outlet may be connected with the Hubbell outlet door as is well known in the art.

To install the outer cylindrical cover 11 onto the installed base plate/outlet cover combination, in an embodiment, set screws 31 are loosened so they do not extend past the interior wall of the outer cylindrical cover. The outer cylindrical cover is lowered over the ¾ outlet cover 15 so that the set screws align with vertical tracks 27. The outer cylindrical cover is lowered until it rests on base plate 13 or its rubber gasket 37. Once the set screws are properly aligned with tracks 27, the set screws are tightened to extend into tracks 27. The length of the set screws may be set so that when the set screws are completely tightened, the set screws are effectively locked into place with outer cylindrical cover 11, and extend into the vertical tracks 27 without causing the outer cylindrical cover to be locked in place or otherwise difficult to be raised and lowered due to pressure from the set screws on outlet cover 15.

Alternatively, instead of set screws 31, outer cylindrical cover 11 could be manufactured with pins or the like which extend from its inner walls to engage with vertical tracks 27 in a similar manner as set screws 31. The only requirement is a mechanism which enables outer cylindrical cover 11 to be raised from and lowered onto base plate 13 so that electrical outlet 17 and its sockets 21 can be accessed when outer cylindrical cover 11 is raised.

FIGS. 8-14 show an alternate embodiment of the outlet cover where the electrical outlet does not have a door to cover the outlet, but instead, the outer cylindrical cover extends over the base so as to completely enclose the outlet. Two slots are added to the base when wires with plugs are inserted into each of the two sockets of the outlet.

Figure 8:
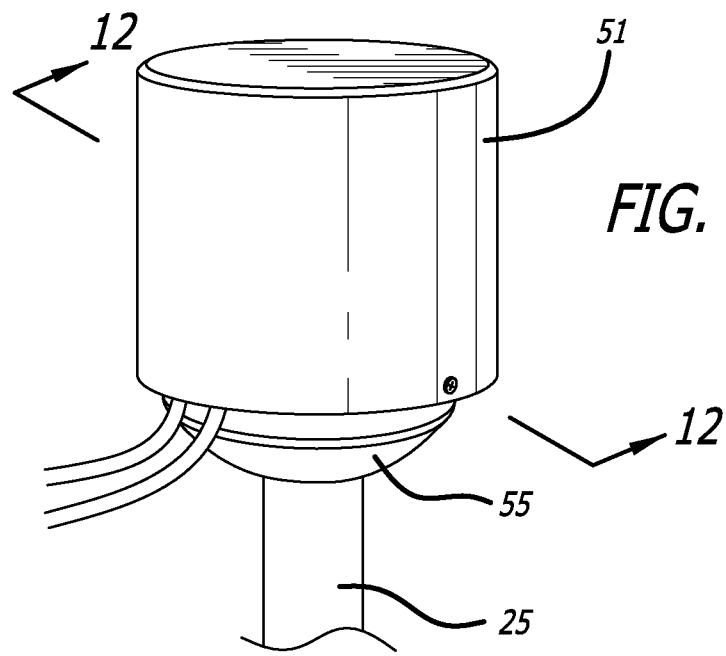
FIG. 8 is a top, side perspective view of the exterior of an alternate embodiment of the invented outdoor electrical outlet enclosure.
Figure 9:
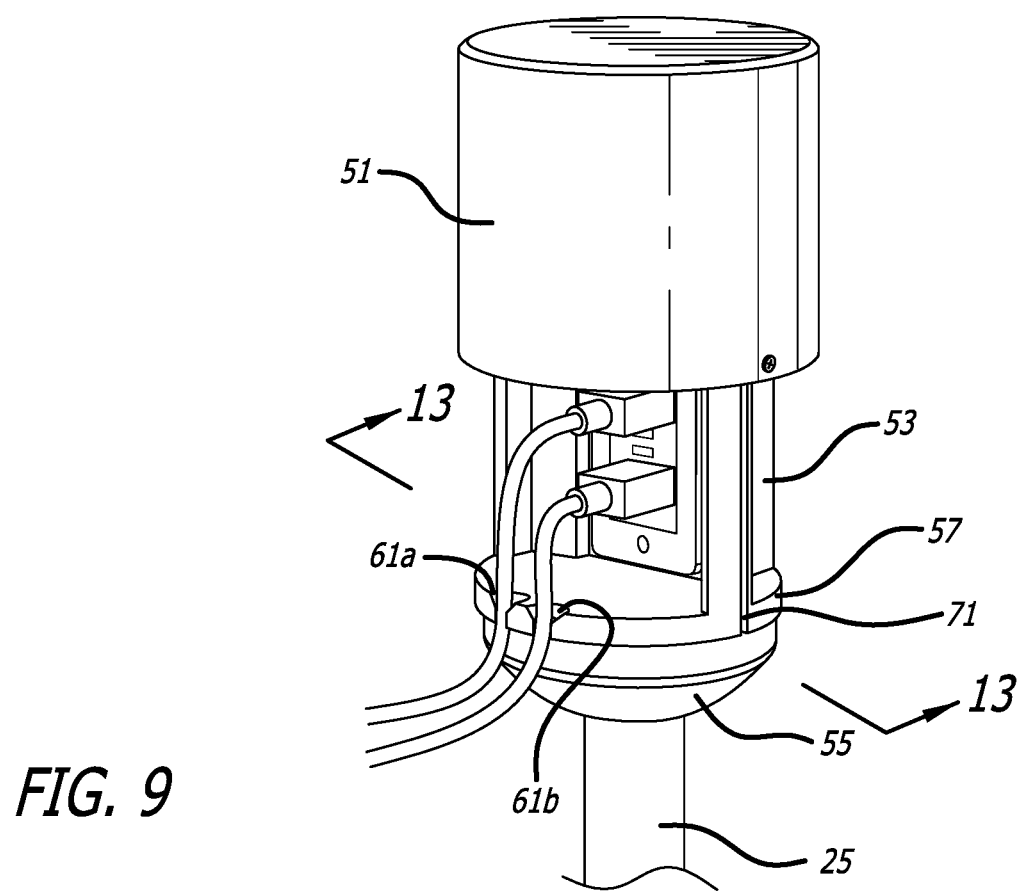
FIG. 9 is a top, side perspective view showing the alternate embodiment of the invented outdoor electrical outlet enclosure with its outer cylindrical cover in a raised position exposing a portion of the outlet cover, a base plate, a post connector and a portion of the outlet.

As shown in FIG. 8, outer cylindrical cover 51 is in a lowered position on top of pipe 25. Outer cover 51 is shown in a raised position in FIG. 9 exposing outlet holder 53, base 57 with slots 61a and 61b for wires 63a and 63b which are not part of the invention, but are shown to illustrate their relationship with slots 61a and 61b. Also shown is dome shaped post connector 55 attached to base 57 for example by a threaded connection. Outlet holder 53 in the alternate embodiment is not a partial cylinder like ¾ cylinder 15 shown in FIGS. 3-7, but is formed to receive an outlet without a door covering its sockets as explained below.

Figure 10:
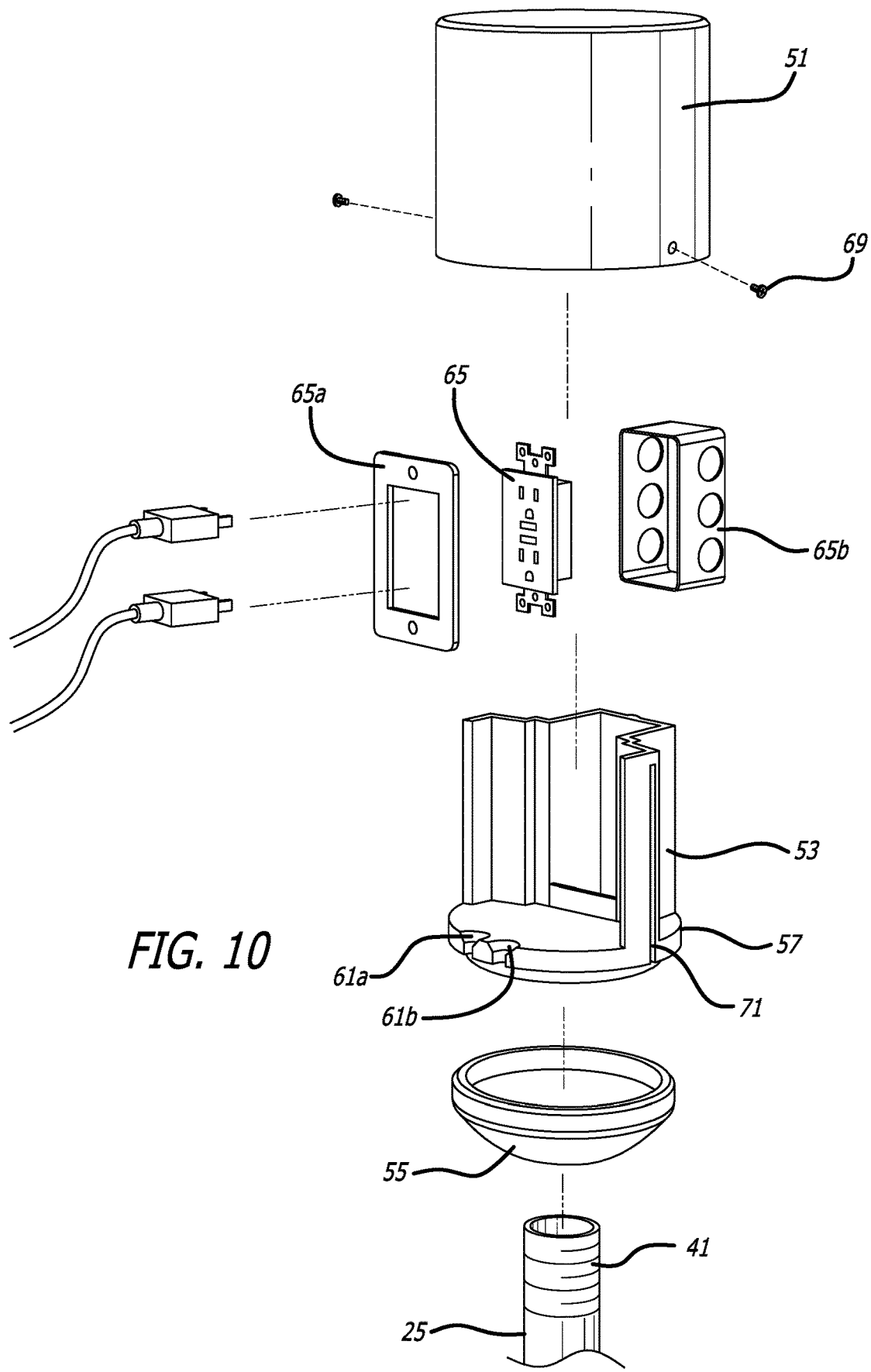
FIG. 10 is a top, side perspective exploded view of the alternate embodiment showing the outer cylindrical cover, the outlet cover, the base plate, the post connector a GFCI outlet and a threaded post for connecting to the post connector from which the power supply enters.

FIG. 10 is an exploded view similar to FIG. 3, except outlet 65 does not have a door to cover its sockets. Instead, outer cover 51 extends over base 57 when it is lowered. Outer cylindrical cover 51 slides down tracks 71 which extend into base 57 instead of ending at base 57 as is the case with tracks 27 shown in FIG. 3. Set screws 69 extend through cover 51 and engage with tracks 71 as cover 51 is raised and lowered. The set screws cooperate with outer cylindrical cover 51 in the same manner as set screws 31 and outer cylindrical cover 11 of the FIGS. 1-7 embodiment. Also shown in FIG. 10 are GFCI outlet 65, faceplate 65a and outlet box 65b which exist in the prior art and do not form part of the invention.

Figure 11:
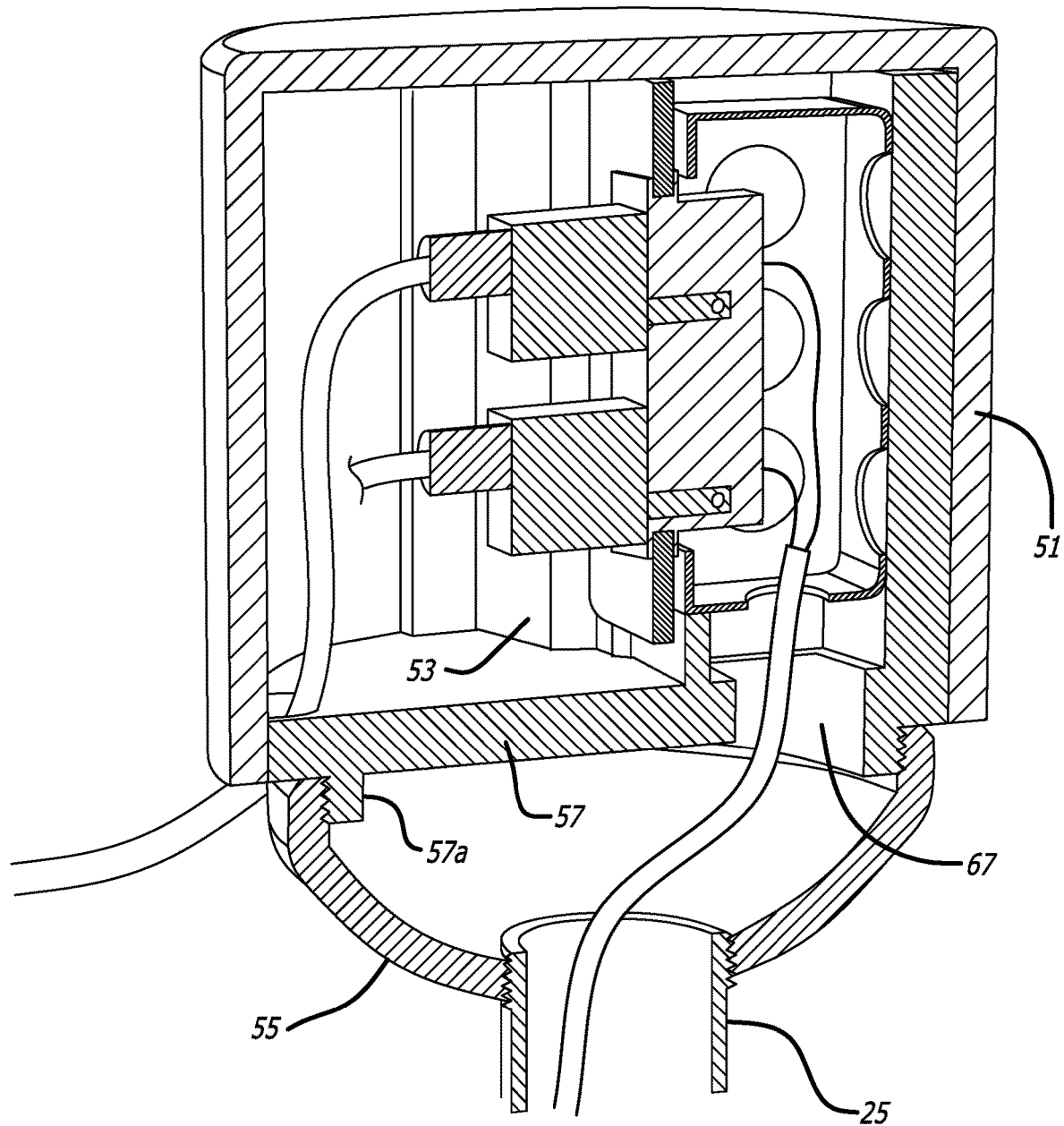
FIG. 11 is a side elevation view of the enclosure taken along line 11-11 of FIG. 7, showing the outer cylindrical cover, the outlet cover, the base plate, the post connector, threaded post and the outlet with two sockets.

As best seen in FIG. 11, outer cylindrical cover 51 in the closed position completely covers base 57. Unlike the FIGS. 1-7 embodiment, there is no need for gaskets 31 and 39 between cover 51 and outlet holder 53 or base 57. FIG. 11 also shows base 57 with an opening 67. Opening 67 is used to feed a cable with wires to connect to terminals on outlet 65 in a manner similar cable 45 shown in FIG. 6. In an embodiment, a separate ridged metal conduit is used to feed the cable through opening 67 to connect to the terminals as an added safety precaution. In this embodiment, outlet box 65b can include a threaded opening at its bottom to receive the ridged metal conduit with corresponding threads on one end so that the outlet box and ridged metal conduit can be threadedly connected, with the ridged metal conduit passing through post 25.

Figure 12:
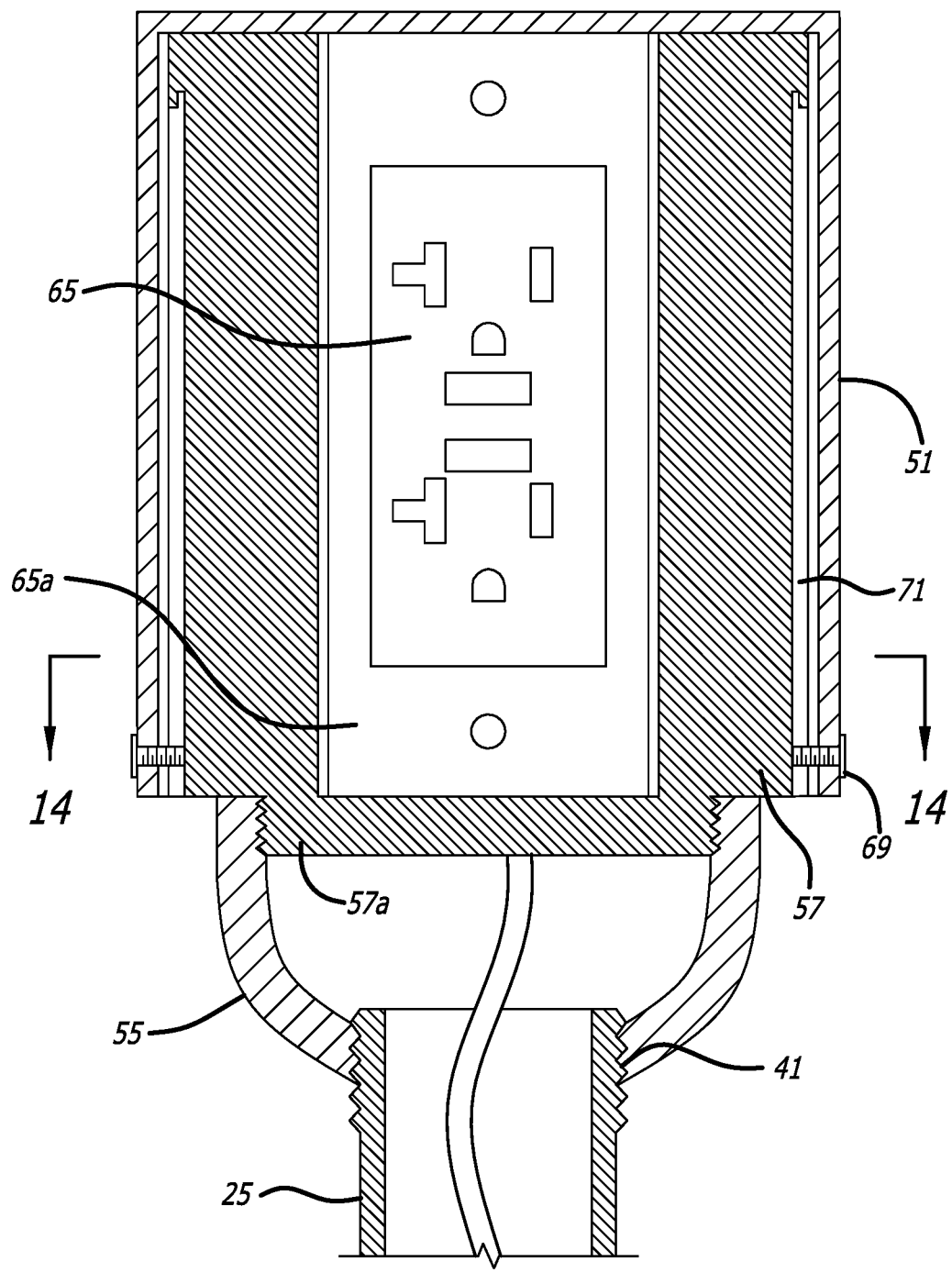
FIG. 12 is a side elevation view taken along line 12-12 of FIG. 8 showing the outer cylindrical cover in its lowered position.

FIG. 12 shows outer cylindrical cover 51 in its lowered position. That is, once the plugs are fully inserted, cover 51 is lowered to extend over base 57 with set screws 69 extending into tracks 71 guiding the outer cylindrical cover down. Of course, outer cylindrical cover 51 can be lowered independent of the presence or absence of plugs inserted into the sockets of outlet 65. Unlike the FIGS. 1-7 embodiment, outer cylindrical cover 51 is lowered as soon as it is released to ensure that it is not inadvertently left in its raised position. Also shown in FIG. 12 is a lower portion 57a of base 57 which in an embodiment is threadedly connected to post connector 55.

Figure 13:
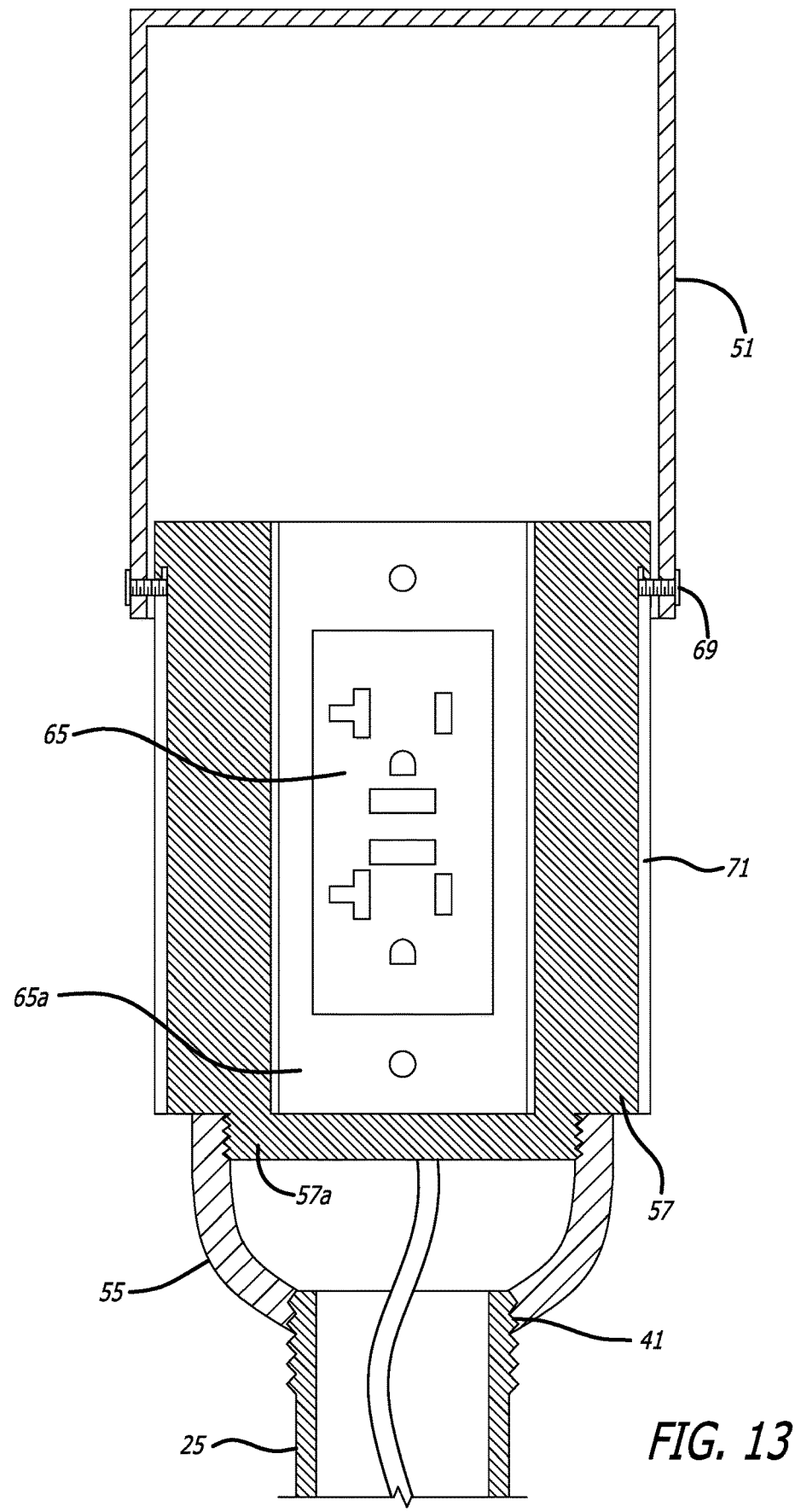
FIG. 13 is a side elevation view taken along line 13-13 of FIG. 9 showing the outer cylindrical cover in its raised position.

FIG. 13 shows outer cover 51 in its fully raised position used to enable plugs with wires 63a and 63b (not shown in FIG. 13) to be plugged into the sockets of outlet 65. Once the plugs are fully inserted as shown in FIG. 12, cover 51 is lowered to extend over base 57 with the wires attached to the plugs passing through slots 61a and 61b so that outlet 35 is completely covered by cover 51.

Figure 14:
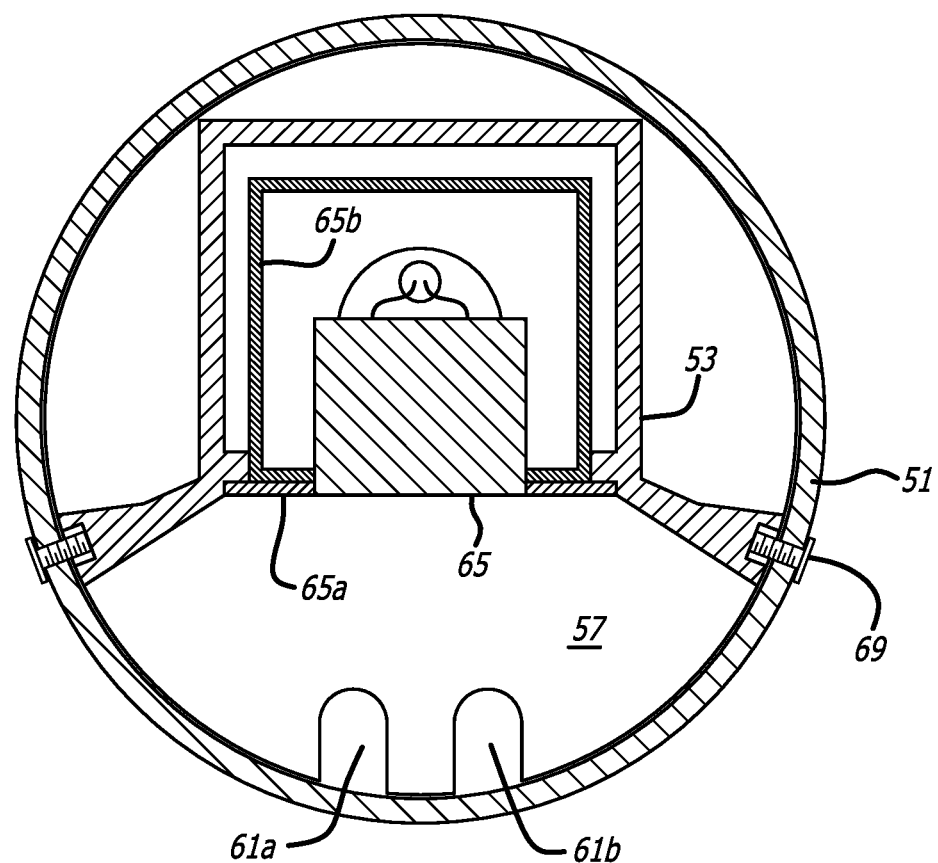
FIG. 14 is a top, plan view of the outer cylindrical cover, and base plate taken along line 14-14 of FIG. 12.

FIG. 14 is a top plan view which shows the arrangement of the elements of the alternate embodiment with outer cylindrical cover 51 completely enclosing outlet holder 53, outlet 65 and base 57 with openings 61a and 61b for wires with plugs to be connected to sockets in outlet 65.

In an embodiment, the outlet enclosure is cast rather than cut out of brass or other suitable material bar stock, to reduce the waste and reduce the number of parts needed for the outlet enclosure. As in the FIG. 1-7 embodiment, some of the parts such as the outer cylindrical cover 51 may be made of plastic.

Accordingly, an outlet enclosure has been shown and described. Although various details and embodiments have been disclosed, the invention is defined with reference to the following claims.

I claim:

1. An outlet enclosure comprising:
    a base plate including at least one slot for receiving a wire with a plug insertable into said electrical outlet and an opening for receiving a second wire;
    an outlet holder for coupling to electrical outlet, said outlet holder including at least one track extending in a vertical direction along an outer surface of said outlet holder;
    an outer cylindrical cover configured to wrap completely around said outlet holder, said outer cylindrical cover slideable via said at least one track from a lowered position fully enclosing said outlet holder to a raised position exposing said outlet holder; and
    a post connector coupled to said base plate.

2. The outlet enclosure defined by claim 1 further comprising at least one set screw engagable with said at least one track to prevent a rotation of outer cylindrical cover when said at least one set screw is engaged with said at least one track.

3. The outlet enclosure defined by claim 1 wherein said post connector includes threads to threadedly connect to a post.

4. The outlet enclosure defined by claim 1 wherein said outlet holder includes a second track extending in a vertical direction along the outer surface of said outlet holder offset by 180 degrees from said at least one track.

5. The outlet enclosure defined by claim 1 wherein said outer cylindrical cover extends over said base plate in said lowered position.

6. The outlet enclosure defined by claim 1 wherein said post connector includes threads to threadedly connect to said base plate.

7. The outlet enclosure defined by claim 1 wherein said post connector is generally dome shaped and includes threads to threadedly connect to a post.

8. The outlet enclosure defined by claim 1 wherein said outer cylindrical cover includes on its inner side surface at least one pin or screw configured to engage a corresponding one of said at least one track.

9. The outlet enclosure defined by claim 8 wherein said at least one pin or screw is removably connected to said outer cylindrical cover.

10. The outlet enclosure defined by claim 1 wherein said post connector, said base plate and said outlet holder form an integrated unit.

11. The outlet enclosure defined by claim 10 wherein said post connector includes threads to threadedly connect to a post.

* * * * *